United States Patent

[11] 3,553,526

[72] Inventors Jozef Cornelis Moerkens;
Antonius Johannes Van Den Bogaart,
Emmasingel, Eindhoven, Netherlands

[21] Appl. No. 876,171
[22] Filed Dec. 3, 1969
[45] Patented Jan. 5, 1971
[73] Assignee U.S. Philips Corporation
New York, N.Y.
a corporation of Delaware. by mesne assignments
[32] Priority Feb. 12, 1966
[33] Netherlands
[31] No. 6601803
Continuation of application Ser. No. 603,384, Dec. 20, 1966, now abandoned.

[54] HIGH FREQUENCY GENERATOR FOR THE IGNITION OF A DISCHARGE LAMP
5 Claims, 3 Drawing Figs.

[52] U.S. Cl. .......... 315/98, 315/100, 315/101, 315/289, 315/206
[51] Int. Cl. .......... H05b 39/00, H05b 41/14
[50] Field of Search .......... 315/100H, 100U, 98, 238—244, 289, 206

[56] References Cited

UNITED STATES PATENTS

| | | | |
|---|---|---|---|
| 3,045,148 | 7/1962 | McNulty et al. .......... | 315/183 |
| 3,134,048 | 5/1964 | Wolfframn et al. .......... | 315/206 |
| 3,309,567 | 3/1967 | Fhedler et al. .......... | 315/176 |
| 3,178,610 | 4/1965 | Moerkens et al. .......... | 315/244 |

*Primary Examiner*—John W. Huckert
*Assistant Examiner*—B. Estrin
*Attorney*—Frank R. Trifari

ABSTRACT: An ignition circuit for a gas discharge tube operated from an alternating current source which provides a high voltage and frequency starting signal to the tube as the source is reaching the peak output voltage. The control terminal of a voltage controlled switch is connected to the charging circuit for a high frequency oscillator energized by the alternating current source to switch on the oscillator in response to a source voltage near the peak output of the source.

INVENTORS
JOZEF C MOERKENS
ANTONIUS J. VAN DEN BOGAART
BY
Frank R. Trifari
AGENT

HIGH FREQUENCY GENERATOR FOR THE IGNITION OF A DISCHARGE LAMP

This application is a continuation of Ser. No. 603,384 now abandoned.

The invention relates to a high-frequency generator for igniting and/or supplying current to a gas and/or vapor discharge tube, said generator comprising an inductor and a capacitor which determine the frequency of the generator and a voltage-sensitive switching element having a semiconductor element, particularly a controlled semiconductor rectifier. The load including the gas and/or vapor discharge tube is connected directly or through a transformer to one or more of the elements of the generator, i.e. the inductor, capacitor or the switching element.

The term "high-frequency" is to be understood to mean herein a frequency exceeding 1000 c/s.

The generators of the kind set forth hitherto used are bulky, complicated and hence expensive. Moreover, their use has been limited only to direct current supplies. The invention has for its object to provide less bulky, less complicated and therefore cheaper high-frequency generators, which may be used in conjunction with an alternating current supply of low frequency. The term "low frequency" is to denote herein a frequency up to a maximum of 100 c/s.

According to the invention the generator is characterized in that the switching element shunts a first series combination of said inductor and capacitor, while the input terminals of the generator are connected via a second series combination of at least said capacitor and of a noncapacitative coupling impedance and in that the switching element becomes conducting at a voltage which is lower than the peak value of the voltage across the first series combination, which would be attained in the absence of the switching element, the latter element being opened at the instant of reversal of the current.

According to the invention it is achieved that the capacitor taking part in determining the frequency is charged until the voltage across the first series combination attains the voltage at which the switching element is closed. Then the capacitor is discharged through the inductor taking part in the determination of the frequency until the current passing through the switching element reverses its direction. Then the capacitor is charged again and the process is repeated.

It is thus possible to render the generator less bulky, and less complicated, so that it is cheaper. The generator may, moreover, be used with a low-frequency AC supply.

The frequency-determining inductor preferably constitutes the primary winding of a transformer stepping up the output voltage of the generator. This provides the advantage that if the output voltage of the generator is not sufficiently high, one and the same inductor may operate as a frequency-determining element and as a primary transformer winding.

It is advantageous to employ the generator in a device comprising said generator and, in addition, a low-frequency AC supply, which is connected to the same load including a gas and/or vapor discharge tube, the coupling impedance being inductive and at least part of this coupling impedance forming the stabilizing impedance of the discharge tube. The coupling impedance then has a double function.

The generator may furthermore be employed advantageously in a device comprising this generator and a low-frequency AC supply, which is connected to the same load. The discharge tube may comprise preheated filament electrodes and with an inductive coupling impedance at least part of the coupling impedance may form the primary winding of a filament current transformer for heating the preheated electrodes of the discharge tube. In this preferred embodiment a separate heating current transformer is not needed.

If the frequency-determining inductor forms the primary winding of a transformer stepping up the output voltage of the generator and if the coupling impedance is inductive and at least part thereof forms the stabilizing impedance of the discharge tube and if the transformer has electrically separated windings, the series combination of the secondary winding of the transformer and the load is preferably shunted by an auxiliary capacitor, the impedance of which, at the frequency of the high-frequency generator, is lower than the impedance of the coupling impedance at said frequency. In the absence of the auxiliary capacitor, the coupling impedance would form a fairly high impedance value in the high-frequency circuit. When the auxiliary capacitor is provided, a comparatively high-frequency current can be produced by the generator.

In the latter case the circuit including the secondary winding of the transformer, the load and the auxiliary capacitor or the circuit including the primary winding of the transformer, the voltage-dependent switching element and the capacitor is preferably provided with an auxiliary inductor, which restricts current pulses in the two transformer circuits.

The auxiliary inductor is preferably included in that portion of the circuit including the primary winding of the transformer, the voltage-sensitive switching element and the capacitor which forms solely part of the high-frequency circuit. In this embodiment the auxiliary inductor itself need pass only a comparatively low current.

The invention will be described more fully with reference to the drawing, in which FIG. 1 shows a high-frequency generator according to the invention.

Figure 1:
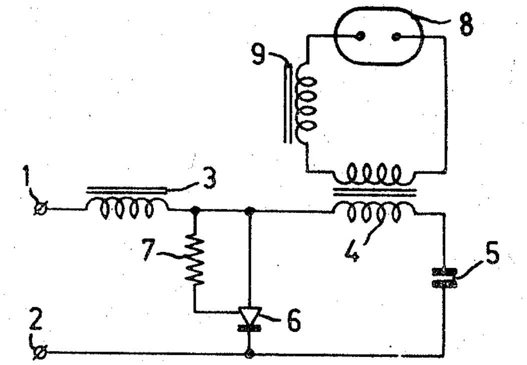

Referring to FIG. 1, reference numerals 1 and 2 designate the connecting terminals of a high-frequency generator. These terminals are bridged by the series combination of a coupling impedance 3, an inductor 4, formed by the primary winding of a transformer, and a capacitor 5. The series combination of the inductor 4 and the capacitor 5 is bridged by a thyristor 6. The control-electrode of the thyristor 6 is controlled through an ohmic resistor 7. The secondary winding of the transformer is connected to the series combination of a discharge tube 8 and a stabilizing coil 9.

This generator operates as follows: From a low-frequency mains, to which the terminals 1 and 2 are connected, the capacitor 5 is charged through the coupling impedance 3 and the winding 4 until across 4–5 the voltage at which the switching element, the thyristor 6, closes, is attained. Then the capacitor 5 is discharged via the inductor 4 and the switching element 6. The inductor 4 and the capacitor 5 determine the generator frequency. When the current passing through the thyristor 6 reverses its direction, the switching element 6 becomes nonconducting. The capacitor 5 is recharged via the coupling impedance 3 and the winding 4. In order to obtain the desired number of high-frequency oscillations, that is to say the desired number of wave trains in each period of the AC supply voltage of the generator, the capacitor 5 must be charged rapidly, since it is then soon ready for being discharged across the frequency-determining inductor 4. For the current passing through the coupling impedance this has the following results. The current passing through said element comprises two components, that is to say, said rapid charging current of the capacitor and a current flowing in the conducting state of the switching element. The first-mentioned component is negligibly small due to its higher frequency with respect to the current passing through the coupling impedance in the conducting state of the switching element, that is to say as compared with the current passing through the coupling impedance, when the latter is connected to the low-frequency supply mains. Due to the switching-on phenomenon occurring in the current of the coupling impedance, when the switching element becomes conducting for the first time in a positive half period of the mains voltage, this current maintains the same direction longer than the duration of half a period of the mains voltage. Therefore, the device may be also AC driven. It should be noted that according as the closing voltage of the switching element is lower, the current across the coupling impedance maintains the same direction for a longer time.

In a practical case the terminals 1 and 2 of the high-frequency generator were connected to an AC supply of 220 V, 50 c/s. The high-frequency generator has to supply current to a high-pressure mercury vapor discharge lamp 8, the ignition voltage of which was 600 V and the working voltage 125 V at 50 c/s. The lamp 8 was fed from the high-frequency oscillatory circuit including the elements 4, 5 and 6 by a high-frequency voltage of adequate value, for example about 2500 V peak value, at 10,000 c/s. The value of the coupling coil 3 was 5 H, that of the inductor 4 2.5 mh. and that of the capacitor 5 about 0.1 $\mu$F. The peak value of the closing voltage of the thyristor 6 was 230 V. This was achieved by a resistor 7 of about 20,000 Ohms. The peak value of the voltage across the series combination of the capacitor 5 and the inductor 4 in the absence of the thyristor 6 was in this case 300 V.

In this arrangement, the elements 5 and 6 (the latter together with 7) may, if desired, be interchanged. If the high-frequency generator has to be fed from a DC supply, the coupling impedance must be a resistor.

Figure 2:
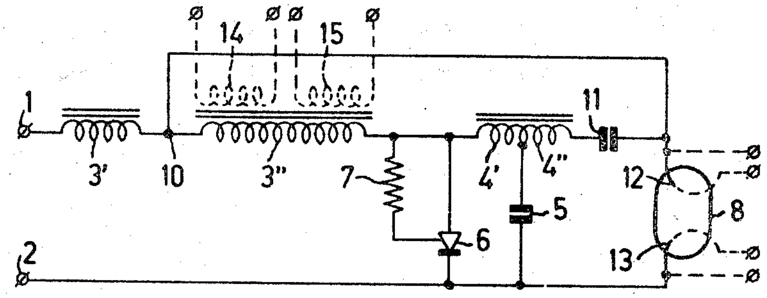
FIG. 2 shows a device comprising a high-frequency generator and a low-frequency AC supply connected to the same load.

Reference numerals 1 and 2 of FIG. 2 again designate the connecting terminals of the device. They serve for connection to the 220 V, 50 c/s mains. These terminals are shunted by the series combination of a coil 3' and a discharge tube 8. Between the tapping 10 of said series combination and the terminal 2 a high-frequency circuit is included, which corresponds chiefly with the circuit shown in FIG. 1. The differences are formed by the auto transformer with the windings 4' and 4'' and the separation capacitor 11. The coupling impedance comprises two parts, that is to say, the series combination of the coils 3' and 3''. The tube 8 is connected in this case to a low-frequency mains via 3' and to the high-frequency generator via the capacitor 11. The separation capacitor 11 has a high impedance at 50 c/s and a low impedance at the value of for example 10,000 c/s of the high-frequency generator. The part 3' of the coupling impedance operates, in addition, as a stabilizing impedance for the tube 8. If the tube 8 is provided with electrodes 12 and 13 of the preheated type, they can be connected to the secondary windings 14 and 15 respectively of a transformer, the primary winding of which is formed by the part 3'' of the coupling impedance. The high-frequency generator of FIG. 2 only serves as an ignition member for the tube 8. When the tube 8 ignites, the voltage between 10 and 2 drops to about 125 $V_{eff}$, that is to say to about 145 V peak voltage, which is not sufficient for the thyristor 6 with the closing voltage of 230 V to become conducting.

Figure 3:
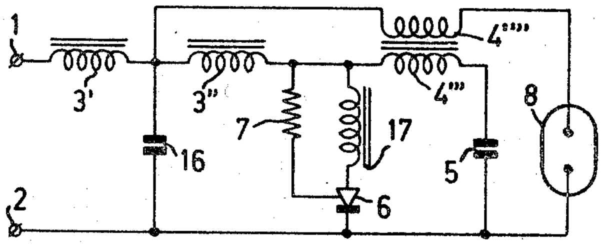
FIG. 3 shows a further device comprising a high-frequency generator and a low-frequency AC supply connected to the same load.

FIG. 3 shows a further embodiment of a device in which a lamp 8 is connected to a low-frequency AC supply and to a high-frequency generator. In contrast to the diagram of FIG. 2, the two current sources are connected in series with each other. The separation capacitor 11 (see FIG. 2) may be dispensed with. Corresponding elements are designated by the same reference numerals as in the preceding FIGS. There is added a decoupling capacitor 16, owing to which the high-frequency currents need not pass through the coil 3'. The capacitor 16 has a value of about 0.1 $\mu$F. Between the primary transformer winding 4''' and the switching element 6 there is provided an auxiliary inductor 17 for restricting the current pulses in this circuit and in the circuit including the winding 4'''' and the lamp 8.

The high-frequency generator shown in FIG. 3 may serve not only for igniting the lamp 8 but also during the operation thereof. This may be achieved by choosing a lower voltage for the thyristor 6 to become conducting, for example 100 V. It is only necessary for this purpose to reduce the ohmic value of the resistor 7 from 20,000 Ohms to about 9,000 Ohms.

We claim:

1. Circuit for the ignition and supply of a gas discharge tube from a low-frequency source, comprising an inductor; a capacitor; a controlled semiconductor switching rectifier having a control terminal and an input-output path; means for connecting the inductor, the capacitor, and the input-output path of the switching rectifier in a first loop circuit; means for coupling the gas discharge tube to the loop circuit, said circuit having at least two input terminals for connecting the circuit to the source; a second inductor; means for connecting the input terminals of the circuit across said capacitor through the second inductor; and means for connecting the control terminal of said rectifier to the input-output path of the rectifier, the means for coupling the gas discharge tube to the loop circuit comprising a third inductor coupled to the first inductor and forming a transformer therewith, and means for connecting the third inductor to the gas discharge tube, the gas discharge tube being provided with a preheated electrode, the circuit further comprising a fourth inductor coupled to at least a part of the second inductor and forming a second transformer therewith and means for connecting the second transformer to the preheated electrode of the discharge tube.

2. A high-frequency generator for igniting a gas discharge tube provided with filaments from a low frequency source, comprising a first inductor; a capacitor; a controlled semiconductor switching rectifier having a control terminal and an input-output path; means for connecting the first inductor, the capacitory and the input-output pat of the switching rectifier in a first loop circuit; means for connecting the loop circuit to the gas discharge tube, said generator having at least to input terminals for connecting the generator to the source; a second inductor; means for connecting the input terminals of the generator across the capacitor through said second inductor; a third inductor coupled to the second inductor and forming a transformer therewith; means for connecting the third inductor to the filaments of the gas discharge tube; and means for connecting the control terminal of the rectifier to the loop circuit.

3. A generator as claimed in claim 2, wherein the means for connecting the loop circuit to the gas discharge tube comprises a fourth inductor coupled to the first inductor and forming a second transformer therewith, and means for connecting the fourth inductor to the gas discharge tube.

4. A generator as claimed in claim 3, wherein the means for connecting the control terminal of the rectifier to the loop circuit comprises a noncapacitive impedance connected to the control terminal of the rectifier, and means for connecting the noncapacitive impedance to a portion of the second remote from the generator terminals.

5. A generator as claimed in claim 3, further comprising a separate means for connecting the gas discharge tube to a portion of the second inductor proximate the generator terminals.